United States Patent Office 2,951,770
Patented Sept. 6, 1960

2,951,770

METHOD OF MAKING ARTIFICIALLY COLORED GRANULES, COATING COMPOSITIONS EMPLOYED THEREIN AND COLOR-COATED GRANULE PRODUCT THEREOF

James R. Lodge and Robert H. Fehner, St. Paul, Minn., assignors to Minnesota Mining and Manufacturing Company, St. Paul, Minn., a corporation of Delaware No Drawing. Filed Apr. 9, 1957, Ser. No. 651,589

5 Claims. (Cl. 117—100)

The present invention relates to artificially color-coated lithic granules, for example, artificially color-coated roofing granules. In particular, our invention relates to novel methods for improving efficiency in the utilization of pigment components in the color-coating of granules, whereby high values of luminous reflectance (lightness) and/or color intensity are attained in the resulting granules with minimum amounts of pigment components. Our invention also particularly concerns novel coating compositions employed in the methods hereof, and to the novel color-coated granule products resulting therefrom.

Artificially colored granules are conventionally manufactured by coating mineral granules of desired size with pigmented aqueous alkali silicate compositions followed by a drying and insolubilizing of the silicate binder. Various additional treatments may be employed, e.g., acid pickle treatments, to further insolubilize the silicate binder so as to render the resulting granule resistant to the effects of prolonged exposure to weather and the elements. The granules are then customarily embedded in roofing and siding materials to provide attractive, protective and weather resistant surfaces thereon.

The most expensive of the components which comprise the coating of an artificially colored granule are the pigment or color producing components. In the production of colored granules in large quantities for sale in commerce and industry, the amount of the color producing components employed is desirably held to a minimum consistent with good quality.

On the other hand, it is an ever present desire in the colored granule industry to improve the color intensity of colored granule coatings, and to increase the reflectance and brilliance in white or light-colored granules. However, in competitive commercial operations such improvement to be feasible must be attained without disproportionately increasing the cost of the resultant granules. Of course, one manner in which the reflectance and/or color intensity of coated granules can be improved is by increasing the amounts of coating materials, particularly pigment materials, in the color-coating. Another manner in which the color-coating can be improved is by employing multiple coating operations, whereby a plurality of color-coatings are applied. However, the use of additional amounts of pigment and other components in the coatings often materially and undesirably increases the cost of the product. Also, multiple coating operations have the disadvantage of multiplying processing steps required and increasing materials handling equipment needed.

The present invention is directed to the provision of artificially colored granules, the color-coatings of which are of improved color intensity and/or luminous reflectance (i.e., lightness) over that attained by conventional methods used prior to our invention. We attain these improvements without substantially increasing the cost of producing the color-coated products. Indeed, by the procedures of the present invention, color-coated granules equivalent in reflectance, color intensity, etc. to those produced in accordance with the previously mentioned conventional methods can be produced with material and substantial cost savings. For example, in the case of white colored granules, it is not unusual that a product equivalent in whiteness and appearance can be prepared by our methods with a 20% saving in expensive white (e.g., titanium dioxide) pigment over that required in single coating operations known prior to this invention.

These and other improvements and advantages are attained, in accordance with the present invention, by dissolving in the pigmented aqueous alkali silicate coating composition, prior to the application of the composition to the raw mineral granules, a significant but extremely minute amount of an alkali-soluble fluorocarbon surface-active compound containing in the molecule a fluorocarbon "tail" which is both oleophobic and hydrophobic. The various fluorocarbon agents or compounds which we employ in our novel process are known for their unique characteristics as surface-active agents, i.e., surfactants. It would not be expected, however, that the use of such materials, and particularly their use in such extremely small amounts, e.g., in the order of 0.01 pound or less per ton of granules, would improve the brilliance, color intensity and reflectivity of the resultant granule coatings just because these materials are surface active in character. Aqueous alkali silicate pigmented coating compositions are extremely hydrophilic in character. The surfaces of the mineral granules to be coated are siliceous in nature and are also highly hydrophilic. Thus complete and efficient wetting of the granule surfaces by the aqueous silicate coating composition is readily and rapidly attained without the aid of any surface-active agent. Furthermore, the suspension or dispersion of the various insoluble pigment and color-producing components in the coating composition is sufficiently stable for the duration of the granule coating step of the process.

That surfactants would not be expected to effect the resultant brilliance, color intensity or reflectance of the coated granules prepared by methods employing the same is further illustrated by the fact that various non-fluorocarbon containing surfactants have occasionally been employed in the color-coating of granules in operations on a commercial scale and have been abandoned as being substantially ineffectual. This is true even though the surface tension of the aqueous coating compositions has been materially reduced by the action of the surfactants over that of compositions of conventional formulation which contain no surfactants.

Further, recent developments and discoveries in the art of color-coating granules have shown that various non-surface active compounds have materially and beneficially improved color-coated granules. In this regard, it has been discovered that significant improvements and advantages are attained by dispersing in the pigmented aqueous alkali silicate coating composition, prior to its application to the raw mineral granule, a significant small amount of polymeric or polymer-forming organic silicon compound, for example sodium methyl siliconate. Such silicone compounds generally do not reduce surface tensions of aqueous alkali silicate solutions. The procedures for employing these organic silicon compounds in the color-coating of granules and the products attained thereby, are described in our copending application Serial No. 604,595, filed August 17, 1956.

Surprisingly, however, we have found that by employing fluorocarbon surface active agents containing a fluorocarbon tail in the molecule in accordance with the procedures hereindescribed, significant and marked improvement in the resultant coated granules and in the efficiency of pigment utilization therein are attained.

The fluorocarbon surface active agents which we employ are alkali-soluble compounds characterized by having in the molecule a fluorocarbon "tail," which is a highly fluorinated or perfluorinated alkyl terminal chain containing 3–12 carbon atoms. The fluorocarbon "tail" is both oleophobic and hydrophobic, in contrast to a corresponding hydrocarbon chain, which is oleophilic. The molecule also includes a hydrophilic polar "head" group which renders the compound soluble and surface active. It is this polar group which determines whether the portion of the molecule containing the fluorocarbon "tail" is anionogenic, cationogenic or non-ionic in character. The polar group can be connected to the fluorocarbon "tail" directly or it can be connected to said "tail" through an interposed stable linking group. Alkali-soluble fluorocarbon surface active agents are presently available commercially from the Minnesota Mining and Manufacturing Company of St. Paul, Minnesota.

Preferred alkali-soluble fluorocarbon surface active agents include anionogenic alkali metal salts of the perfluoroalkanesulfonamido alkylenemonocarboxylic acids, e.g., the potassium salt of N-ethyl, N-perfluorooctanesulfonyl glycine having the formula $$C_8F_{17}SO_2N(C_2H_5)CH_2COOK$$

These compounds have a fluorocarbon "tail" at one end of the molecule and a functional polar carboxylate group at the other end of the molecule, these groups being linked together by an interposed sulfonamido alkylene group. Preferably the fluorocarbon "tail" group in these salts contains from 5 to 10 perfluorinated carbon atoms. The acids themselves can be employed in our procedures, as can alkali-soluble metal and ammonium salts other than the above-mentioned potassium salt. The perfluoroalkanesulfonamido alkylenemonocarboxylic acids and salts and their preparation, are described in the United States patent application of Harvey A. Brown, Serial No. 556,047, filed December 29, 1955.

Another type of highly suitable alkali-soluble anionogenic fluorocarbon surface active compound comprises the fluorocarbon sulfonic acids and salts thereof, having in the molecule a fluorocarbon "tail" preferably consisting of from 5 to 10 perfluorinated carbon atoms. We prefer the alkali-metal and ammonium salts of the perfluorocarbon sulfonic acids, for example potassium perfluoro-n-octanesulfonate having the formula $$C_8F_{17}SO_3K$$

The acids themselves can also be employed in our procedures, as can the alkali-soluble alkaline earth salts of the acids, for example, the calcium salt of perfluoro-n-octanesulfonic acid. The perfluorocarbonsulfonic acids and derivatives thereof are described in Brice et al. Patent No. 2,732,398, granted January 24, 1956.

Another type of highly suitable alkali-soluble fluorocarbon surface active compound having a fluorocarbon "tail" in the molecule, and which is cationogenic in character are the perfluoroalkanesulfonamido polymethylenedialkylamine quaternary ammonium salts. A preferred example of this type of fluorocarbon surface-active compound is the quaternary ammonium iodide salt of perfluorooctanesulfonamido propylene dimethylamine having the formula $$C_8F_{17}SO_2N(H)C_3H_6N(CH_3)_3I$$

These compounds provide an organic cationogenic group united to the polymethylene linkage and contain a quaternary nitrogen atom covalently bonded to four acyclic hydrogenated carbon atoms and electrostatically bonded to an anion. It is this cationogenic group that causes the organic chain (containing the fluorocarbon tail) to be a cation having positive charge at the quaternary nitrogen position. These quaternary compounds are described in Brown et al. Patent No. 2,759,019, granted August 14, 1956.

Another type of highly suitable quaternary cationogenic alkali-soluble compound which we employ containing a fluorocarbon tail is the perfluoroalkylamido polymethylene quaternary nitrogen compounds, e.g., trimethyl (gamma-perfluorocaprylamido) propylene ammonium iodide having the formula $$C_7F_{15}CON(H)C_3H_6N(CH_3)_3I$$

Similar to the sulfonamido quaternary compounds above described, these fluorocarbon surface active agents contain a quaternary nitrogen atom covalently bonded to four acyclic hydrogenated carbon atoms and electrostatically bonded to an anion. This quaternary group causes the organic chain containing the fluorocarbon tail to be cationogenic. These perfluoroalkylamido polymethylene quaternary nitrogen compounds are described in Ahlbrecht Patent No. 2,764,602, granted September 25, 1956.

Still another type of alkali-soluble anionogenic fluorocarbon surface active agent which is useful in our procedures comprises the fluorocarbon carboxylic acids and salts thereof. These compounds have a functional polar carboxylate group at one end of the molecule and a fluorocarbon tail connected thereto, this tail preferably containing 5 to 10 perfluorinated carbon atoms. Fluorocarbon acids of this latter type and their preparation are described in Diesslin Patent No. 2,567,011, granted September 4, 1951.

The coating compositions to which we add the significant but minute amounts of fluorocarbon surface active agent in accordance with the procedures hereof, is quite highly alkaline. It is not unusual, for example, for the alkalinity of the coating composition to be roughly equivalent to that of a 10 percent solution of sodium hydroxide in water, and to have a pH of about 11–12. The fluorocarbon surface-active agents preferably are readily soluble in such alkali solutions. It is sufficient, however, if they are soluble in some significant extent, for example in the order of one part in ten thousand, since it is in concentrations of this order that we employ the fluorocarbon surface-active agents. All of the fluorocarbon surface-active agents we employ are soluble to at least about this extent; and are thus alkali-soluble for our purposes.

In our novel procedures we prefer to employ uni-univalent ionogenic acids and salts containing a fluorocarbon "tail" in the molecule. By uni-univalent we mean that each ion forming radical of the compound is univalent. Salts of the acids, and quaternary ammonium salts are preferable for practical reasons.

The existence of multi-valent metal ions, e.g., ions of heavy metals, in the silicate coating composition is also generally thought to be undesirable; as such ions tend likewise to disturb the stability of the silicate solution in the coating composition. Should substantial amounts of the silicate gel or precipitate from solution in the coating composition, due to instability of the solution, the bond strength and weather-resistance of the resulting coated granules are adversely affected. However, the fluorocarbon compounds hereof are used in very minute amounts. Thus the use of those alkali-soluble compounds in acid form or in the form of salts of the multivalent metals is generally permissible.

Having now generally described our invention and various of the fluorocarbon surfactants, and in particular various ionogenic fluorocarbon compounds containing a fluorocarbon "tail" in the molecule, which can suitably be employed in our procedures, the following non-limitative examples of preferred formulations and procedures will now be set forth in order to more specifically illustrate the same. Unless otherwise indicated, amounts are listed in parts by weight.

*Example I*

| | Pounds |
|---|---|
| Mineral granules (−10 +35 mesh greystone) | 2000 |
| Titanium dioxide | 30 |
| Kaolin | 32 |

|  | Pounds |
|---|---|
| "K" brand sodium silicate solution (spec. grav. 1.48, $Na_2O:SiO_2$ ratio=1:2.9) | 65 |
| Water | 30 |
| Potassium salt of N-ethyl, N-perfluorooctanesulfonyl glycine, having the formula $C_8F_{17}SO_2N(C_2H_5)CH_2COOK$ | 0.01 |

The fluorocarbon compound in powder form was first dissolved in the water, and the sodium silicate, titanium dioxide and kaolin than added in that order to form a slurry. The latter then was mixed with the granules, which had been warmed previously to about 200° F., in a tumbling-barrel mixer through which a stream of air was continuously passed until the granules were thoroughly coated and dried to a free-flowing state. The granules were then fired in a rotary kiln for 20–25 minutes to a temperature of about 950° F., and cooled in a rotary tube cooler, where they were lightly sprayed with a dilute aqueous solution of $AlCl_3$ and HCl to neutralize residual alkalinity and further insolubilize the colored coating and to assist in cooling the granules. A final treatment with about five pounds of light slate oil, to reduce dusting and promote adhesion by asphalt, completed the process.

The resulting white granules appeared on microscopic examination to be very uniformly coated, and exhibited an opaque whiteness of extremely high intensity. On the basis of reflectance values obtained with a "Photovolt" reflectometer, these granules were some five percent improved in whiteness over granules prepared in an identical manner except for the omission of the fluorocarbon compound. In order to obtain an equivalent increase in reflectance value in the absence of the fluorocarbon compound by increasing the amount of pigment, it was found necessary to add about 6 lbs. of titanium dioxide pigment, making a total of 36 lbs. or an increase of 20 percent in pigment content.

Thus, the addition of 0.01 pound of the fluorocarbon surface-active agent resulted in a saving of 600 times its own weight in the expensive titanium dioxide pigment.

The potassium salt of N-ethyl, N-perfluorooctanesulfonyl glycine is presently available from the Minnesota Mining and Manufacturing Company.

Other alkali metal salts of the N-perfluorooctanesulfonyl glycine, for example the lithium salt and the sodium salt, can be employed instead of the potassium salt with equivalent results. Where the N-ethyl, N-perfluorooctanesulfonyl glycine is employed in the form of acid, instead of being employed as an alkali metal salt, a slightly different procedure of addition is desirably followed since the acid is somewhat more difficultly soluble in water than are the alkali metal salts. In such instance, we prefer first to dissolve the sodium silicate in the water solution, thereby rendering the solution quite alkaline. Then the acid, which is alkali-soluble, is added to the alkaline solution and easily dissolved therein.

The addition of any amount of the fluorocarbon compound employed in the present example to the granule coating composition produces a definite and beneficial effect. For example the addition of as little as 0.0025 lb. of the potassium salt of N-ethyl, N-perfluorooctanesulfonyl glycine results in the saving of roughly 10 percent or 3 lbs. of the pigment materials. On the other hand, there appears to be some upper limit in the addition of the fluorocarbon compound beyond which little or no additional improvement is attained. In the instance of the fluorocarbon agent employed in the present example we have found this limit to be just greater than about 0.01 lb. of the fluorocarbon compound per ton of raw mineral granules. We prefer not to exceed this upper limit for economic reasons. Also, particularly in the preparation of high temperature color-coated granules, such as in the case of the present example, the presence of greatly excessive amounts of the organic compound may result in a charring thereof thereby causing an actual decrease in reflectance or lightness of the resulting granule coating.

The preceding example has illustrated the preparation by our procedures of an improved artificially colored white granule. The methods hereof are also highly suited to the preparation of coated granules of various colors other than white. The following example will illustrate a formulation for the preparation of an improved grey-green granule in accordance with the procedures hereof.

*Example II*

|  | Pounds |
|---|---|
| Mineral granules (−10 +35 mesh greystone) | 2000 |
| Titanium dioxide | 8 |
| Chrome oxide (green) pigment | 1.6 |
| Carbon black | 0.1 |
| Kaolin | 10 |
| "K" brand sodium silicate solution | 35 |
| Water | 13 |
| Quaternary ammonium iodide salt of perfluorooctanesulfonamido propylene dimethylamine | 0.01 |

In this example the formula and procedure employed were identical with those of Example I except that the alkali soluble fluorocarbon compound employed there was replaced by the quaternary ammonium iodide salt of perfluoroctanesulfonamido propylene dimethylamine, said quaternary salt having the formula $$C_8F_{17}SO_2N(H)C_3H_6N(CH_3)_3I$$

This quaternary ammonium salt can be prepared in the manner disclosed in Brown et al. Patent No. 2,759,019, granted August 14, 1956. It is a cationogenic univalent salt available from the Minnesota Mining and Manufacturing Company.

The resulting grey-green colored granules were uniformly coated over virtually the entire surface thereof. The brilliance and color intensity of the granules, when viewed in bulk form, for example when viewed on the roof of a building, had an improved color intensity clearly perceivable, even to the untrained eye, over granules of identical formulation except where no fluorocarbon compound hereof was employed. It has been found that in order for a granule of the latter mentioned type to attain the same color intensity (when viewed in bulk form) as the granules of the present example, a 25 percent (2 lbs.) increase in the amount of titanium dioxide pigment and 12.5 percent (.2 lb.) increase in the amount chrome oxide pigment is necessary.

Thus the incorporation into the formulation of the minute amount of 0.01 lb. of the quaternary fluorocarbon salt resulted in a total saving of 220 times the weight of the fluorocarbon compound added.

Although various anionogenic compounds containing a fluorocarbon tail were described in connection with the preparation of the white granules of Example I, and a cationogenic fluorocarbon compound containing a fluorocarbon tail was employed in the production of the grey-green granules of the present example, the cationogenic compounds can as well be used in the preparation of the white granules and the anionogenic fluorocarbon compounds used in the grey-green granules. In fact, each of the alkali-soluble ionogenic fluorocarbon compounds we employ is useful in providing the the improvements herein described in the case of coated granules of substantially any color. However results hereof appear to be most effective in the case of lighter colored and pastel colored granules.

An additional and unexpected advantage of the present invention resides in the effectiveness of the fluorocarbon compounds we employ in further improving the color intensity and/or reflectance of granules prepared by procedures in which an effective pigment-saving color-improving additive is already employed. The following example illustrates how the use of the fluorocarbon compounds supplements the highly beneficial results attained by the procedures described in our copending application Serial No. 604,595, filed August 17, 1956.

*Example III*

|  | Pounds |
|---|---|
| Mineral granules (−10 +35 mesh greystone) | 2000 |
| Titanium dioxide | 24 |
| Kaolin | 32 |
| "K" brand sodium silicate | 60 |
| Water | 30 |
| Sodium methyl siliconate solution (containing about 31% of non-volatile material, corresponding to about 20% of methyl silicone ($CH_3SiO_{1.5}$); available from the General Electric Company under the designation "SC-50") | 2 |
| Potassium salt of N-ethyl, N-perfluorooctane sulfonyl glycine | 0.01 |

The procedure followed in the preparation of the granules of the present example was the same as that described hereinabove in connection with Example I with the sodium methyl siliconate being added last to the slurry, although the point at which the silicone is added to the composition is not critical. The resulting granules upon microscopic examination were observed to be uniformly and virtually completely coated over the granule surfaces. Reflectance values of the white granules thus prepared were obtained with the aid of a "Photovolt" reflectometer.

For comparative purposes granules were prepared by similar procedures except: in one series of tests the silicone was omitted from the coating composition of the granules; and in the second series both the fluorocarbon and silicone compounds were omitted from the coating composition. With the formulation otherwise remaining constant pigment levels were adjusted in each series, in various granule lots prepared, until granules in each series were attained having reflectance values equalling that of the granules of this example. It was found that in order to attain such reflectance values granules coated with the composition containing neither the fluorocarbon or the slicone compounds required 40 lbs. of the titanium dioxide pigment per ton of raw granules. Granules coated with the composition containing the silicone but no fluorocarbon compound required 30 lbs. of pigment to attain this reflectance value.

It can thus be seen that whereas 10 lbs. (25%) of pigment are saved when the silicone is employed alone, a saving of 16 lbs. (40%), or an additional saving of 6 lbs., occurs where the fluorocarbon and the silicone compounds are both employed.

Although in the present example sodium methyl siliconate was selected from the various silicone compounds disclosed in said application Serial No. 604,595 as the silicone additive, other silicone compounds can be used in conjunction with either the fluorocarbon compound employed in this example, or in conjunction with other fluorocarbon compounds which we employ.

Hereinabove, we have described our novel procedures for making new and improved color-coated granules having high reflectance and/or color intensity and with high efficiency in the utilization of pigment components. With the aid of specific examples we have disclosed our preferred procedures. We do not intend, however, to be limited to the specific procedures and formulations disclosed. For instance, although the granules prepared in each of the specific examples hereof were fired at 950° F. temperatures and are thus "high temperature" granules, our procedures are also highly useful in the preparation of coated granules which are fired at somewhat lower temperatures, for example, temperatures in the order of 400–450° F. Also, granules of different type and size range than those specifically disclosed herein can be employed, as can various types of alkalisilicate binders. The granules can be coated in accordance with known multiple coating procedures; and, if desired, the novel coating compositions hereof can be applied to various surfaces.

What we claim is as follows:

1. In the manufacture of artificially colored granules having a pigmented insolubilized alkali silicate color coating with improved efficiency in the utilization of pigment components, the method including dissolving in a pigmented aqueous alkali silicate color-coating composition a significant minute quantity of an alkali-soluble fluorocarbon surface-active compound having a fluorocarbon "tail" in the molecule, applying said composition to the raw granules, drying the coated granules to a free-flowing state, and then firing the coated granules, said quantity of said fluorocarbon compound effecting improvement in the fired granules in at least one of the properties of color intensity and luminous reflectance.

2. The method of claim 1 in which the said fluorocarbon compound is an alkali-soluble uni-univalent ionogenic compound having a fluorocarbon "tail" of from 5 to 10 carbon atoms.

3. The method of claim 2 in which the fluorocarbon compound is the potassium salt of N-ethyl, N-perfluorooctanesulfonyl glycine.

4. Artificially colored mineral granules prepared in accordance with the method of claim 1.

5. A coating composition suitable for application to mineral granules in the provision of color-coated granules wherein pigment components are efficiently utilized, said composition comprising a pigmented aqueous alkali silicate coating composition having dissolved in the aqueous vehicle thereof a significant minute quantity of an alkali-soluble fluorocarbon surface-active compound having a fluorocarbon "tail" in the molecule, said quantity of said fluorocarbon compound effecting improvement in the completed color-coated granules in at least one of the properties of color intensity and luminous reflectance.

References Cited in the file of this patent

UNITED STATES PATENTS

| 2,588,828 | Greiner | Mar. 11, 1952 |
| 2,695,851 | Lodge | Nov. 30, 1954 |
| 2,809,990 | Brown | Oct. 15, 1957 |